US012725555B2

(12) United States Patent
Sun et al.

(10) Patent No.: US 12,725,555 B2
(45) Date of Patent: Sep. 1, 2026

(54) DISPLAY CONTROL METHOD AND APPARATUS FOR DISPLAY PANEL, AND DEVICE AND STORAGE MEDIUM

(71) Applicant: KUNSHAN GO-VISIONOX OPTO-ELECTRONICS CO., LTD., Kunshan (CN)

(72) Inventors: Guangyuan Sun, Suzhou (CN); Xiuning Shangguan, Suzhou (CN); Xiyang Jia, Suzhou (CN); Fajing Liu, Suzhou (CN); Haibin Jiang, Suzhou (CN); Xiaobao Zhang, Suzhou (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 19/061,089

(22) Filed: Feb. 24, 2025

(65) Prior Publication Data

US 2025/0191513 A1 Jun. 12, 2025

Related U.S. Application Data

(63) Continuation of application No. PCT/CN2022/127304, filed on Oct. 25, 2022.

(30) Foreign Application Priority Data

Aug. 26, 2022 (CN) ......................... 202211031622.1

(51) Int. Cl.

*G09G 5/10* (2006.01)
*G09G 3/20* (2006.01)
*G09G 3/3208* (2016.01)

(52) U.S. Cl.

CPC ......... *G09G 3/2074* (2013.01); *G09G 3/3208* (2013.01); *G09G 2320/0257* (2013.01);

(Continued)

(58) Field of Classification Search

CPC ............... G09G 3/2074; G09G 3/3208; G09G 2320/0257; G09G 2320/0626;

(Continued)

(56) References Cited

U.S. PATENT DOCUMENTS

2011/0216098 A1 9/2011 Choi et al.
2013/0328755 A1 12/2013 Al-Dahle et al.

(Continued)

FOREIGN PATENT DOCUMENTS

CN 104375294 A 2/2015
CN 104732949 A 6/2015

(Continued)

OTHER PUBLICATIONS

International Search Report issued on May 12, 2023, in corresponding International Application No. PCT/CN2022/127304; 6 pages.

(Continued)

*Primary Examiner* — Jennifer T Nguyen
(74) *Attorney, Agent, or Firm* — Maier & Maier, PLLC

(57) ABSTRACT

A display control method and apparatus for a display panel, a device, and a storage medium. The display control method for a display panel includes: obtaining a reference register value corresponding to a reference gray level of a display panel, where a display parameter of the display panel when the display panel performs reference gray level display based on the reference register value meets a target requirement, and the display parameter includes brightness; and adjusting the reference register value to obtain a target register value, and using the target register value as a register value corresponding to a gray level 0 of the display panel, where brightness of the display panel when the display panel performs gray level 0 display based on the target register value meets a requirement.

19 Claims, 4 Drawing Sheets

(52) U.S. Cl.
CPC ............... *G09G 2320/0626* (2013.01); *G09G 2320/0673* (2013.01); *G09G 2320/0693* (2013.01); *G09G 2330/021* (2013.01)

(58) Field of Classification Search
CPC ... G09G 2320/0673; G09G 2320/0693; G09G 2330/021
USPC .......................................................... 345/694
See application file for complete search history.

(56) References Cited

U.S. PATENT DOCUMENTS

| | | | | |
|---|---|---|---|---|
| 2014/0118228 | A1 | 5/2014 | Kang | |
| 2019/0122619 | A1 | 4/2019 | Asaoka et al. | |
| 2021/0097920 | A1* | 4/2021 | Yu | G09G 3/2007 |
| 2022/0198977 | A1 | 6/2022 | Kim et al. | |
| 2022/0293023 | A1* | 9/2022 | Zhou | G09G 3/3208 |
| 2023/0343300 | A1* | 10/2023 | Liu | G09G 3/3291 |

FOREIGN PATENT DOCUMENTS

| | | | | |
|---|---|---|---|---|
| CN | 104751818 A | | 7/2015 | |
| CN | 112908251 A | | 6/2021 | |
| CN | 114220377 | * | 3/2022 | G09G 3/20 |
| CN | 114220377 A | | 3/2022 | |
| CN | 114582284 A | | 6/2022 | |
| CN | 114783346 A | | 7/2022 | |
| CN | 114882822 A | | 8/2022 | |
| CN | 114898693 A | | 8/2022 | |
| JP | 2005286441 A | | 10/2005 | |
| JP | 2006313189 A | | 11/2006 | |
| KR | 1020150007061 A | | 1/2015 | |
| WO | 2021147086 A1 | | 7/2021 | |

OTHER PUBLICATIONS

Office Action issued on May 5, 2023, in corresponding Chinese Application No. 202211031622.1; 25 pages.

Office Action issued on Sep. 4, 2023, in corresponding Chinese Application No. 202211031622.1; 22 pages.

Xu et al., "Analysis of FFS Image Sticking with Negative Liquid Crystal" Chinese Journal of Liquid Crystals and Displays, vol. 30, No. 3; Jun. 15, 2015; 5 pages English Abstract included.

Lei et al., "Low Power Consumption Design for LCD Panel", Advanced Display, China Academic Journal Electronic Publishing House, Jun. 2013; 6 pages English Abstract included.

Office Action issued on Sep. 28, 2025, in corresponding Korean Application No. 10-2025-7006240, 15 pages.

Office Action issued on Feb. 3, 2026, in corresponding Japanese Application No. 2025-512193, 8 pages.

* cited by examiner

DISPLAY CONTROL METHOD AND APPARATUS FOR DISPLAY PANEL, AND DEVICE AND STORAGE MEDIUM

CROSS-REFERENCE TO RELATED APPLICATIONS

This application is a continuation of International Patent Application No. PCT/CN2022/127304, filed on Oct. 25, 2022, which claims priority to Chinese Patent Application No. 202211031622.1 filed on Aug. 26, 2022, disclosures of both of which are incorporated herein by reference in their entireties.

TECHNICAL FIELD

The present application relates to the field of display technologies, and specifically relates to a display control method and apparatus for a display panel, a device, and a storage medium.

BACKGROUND

With continuous upgrade of display technologies, people have increasingly high requirements for the display effect of a display panel. Currently, to improve the display effect of the display panel, a gamma module is usually used to adjust a data voltage and display brightness corresponding to the grayscale of the display panel.

However, in the related art, the display panel still has the problem of image sticking, smear, or the like.

SUMMARY

Embodiments of the present application provide a display control method and apparatus for a display panel, a device, and a storage medium, which can ameliorate the problems of image sticking and smear.

According to a first aspect, the embodiments of the present application provide a display control method for a display panel, the method including: obtaining a reference register value corresponding to a reference gray level of the display panel, where a display parameter of the display panel when the display panel performs reference gray level display based on the reference register value meets a target requirement, and the display parameter includes brightness; and adjusting the reference register value to obtain a target register value, and using the target register value as a register value corresponding to a gray level 0 of the display panel, where brightness of the display panel when the display panel performs gray level 0 display based on the target register value meets a requirement.

Based on the same inventive concept, according to a second aspect, the embodiments of the present application provide a register value determination apparatus for a display panel, the apparatus including:

- a data obtaining module configured to obtain a reference register value corresponding to a reference gray level of the display panel, where a display parameter of the display panel when the display panel performs reference gray level display based on the reference register value meets a target requirement, and the display parameter includes brightness; and
- an adjustment module configured to adjust the reference register value to obtain a target register value, and use the target register value as a register value corresponding to a gray level 0 of the display panel, where brightness of the display panel when the display panel performs gray level 0 display based on the target register value meets a requirement.

Based on the same inventive concept, according to a third aspect, the embodiments of the present application provide an electronic device, the electronic device including: a processor and a memory storing computer program instructions, where the computer program instructions, when executed by the processor, cause the display control method for a display panel according to any one of the embodiments of the first aspect to be implemented.

Based on the same inventive concept, according to a fourth aspect, the embodiments of the present application provide a computer-readable storage medium having a computer program stored thereon, where the computer program, when executed by a processor, causes the display control method for a display panel according to any one of the embodiments of the first aspect to be implemented.

According to the display control method and apparatus for a display panel, the device, and the medium provided in the embodiments of the present application, higher VGMP is not directly selected as a data voltage at the gray level 0. Instead, the target register value corresponding to the gray level 0 is determined based on the reference register value corresponding to the reference gray level. The register value corresponds to the data voltage, that is, the data voltage corresponding to the gray level 0 is determined based on a data voltage corresponding to the reference gray level, so that the data voltage corresponding to the gray level 0 may be determined according to an actual requirement of the display panel, thereby avoiding binding the data voltage at the gray level 0 to VGMP, and ameliorating the problems of image sticking and smear.

BRIEF DESCRIPTION OF DRAWINGS

Other features, objectives, and advantages of the present application will become more apparent by reading a detailed description below of non-limiting embodiments with reference to the accompanying drawings, where the same or similar reference numerals represent the same or similar features, and the accompanying drawings are not drawn to actual scale.

DETAILED DESCRIPTION

Figure 1:
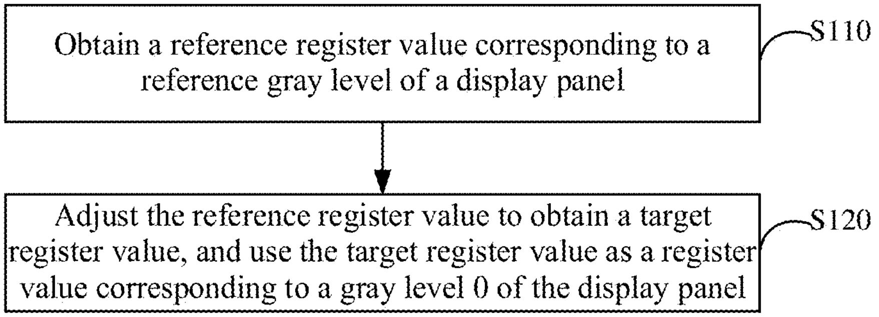
FIG. 1 is a schematic flowchart of a display control method for a display panel according to an embodiment of the present application.

The features and exemplary embodiments of all aspects of the present application will be described in detail below. To make the objectives, technical solutions, and advantages of the present application clearer and more understandable, the present application will be further described in detail with reference to the accompanying drawings and specific embodiments. It should be understood that the specific embodiments described herein are only used to explain the present application and are not used to limit the present application. For those skilled in the art, the present application may be implemented without some of these specific details. The following description of the embodiments is only intended to provide a better understanding of the present application by illustrating examples of the present application.

It should be noted that the relational terms such as “first” and “second” herein are only used to distinguish one entity or operation from another, and do not necessarily require or imply that any actual relationship or sequence exists between these entities or operations. Moreover, the terms “include”, “comprise”, or their any other variants are intended to cover a non-exclusive inclusion, so that a process, a method, an article, or a device that includes a list of elements not only includes those elements but also includes other elements which are not expressly listed, or further includes elements inherent to such process, method, article, or device. In the absence of more restrictions, an element defined by “including a . . . ” does not exclude another identical element in a process, method, article, or device that includes the element.

It should be understood that the term “and/or” used herein is merely a description of an association relationship between associated objects, indicating that three relationships may exist, for example, A and/or B, which may indicate that only A exists, both A and B exist, and only B exists. In addition, the character “/” herein generally indicates an “or” relationship between the associated objects.

It is apparent to those skilled in the art that various modifications and changes can be made in the present application without departing from the spirit or scope of the present application. Therefore, the present application is intended to cover the modifications and changes of the present application that fall within the scope of the corresponding claims (technical solutions claimed) and equivalents thereof. It should be noted that the implementations provided in the embodiments of the present application can be combined with each other without contradiction.

Before elaborating on the technical solutions provided in the embodiments of the present application, to facilitate understanding of the embodiments of the present application, the problems existing in the related art are specifically listed in the present application:

A display panel is usually composed of a plurality of light-emitting pixels, and the light-emitting pixel includes a pixel circuit and a light-emitting element. The pixel circuit is usually composed of a thin-film transistor (TFT) and a capacitor. The light-emitting element may usually include an organic light-emitting diode (OLED) or another light-emitting device.

However, the display panel has the problem of image sticking or smear during display.

The inventors have found through research that, taking a drive transistor in a pixel circuit being a P-type transistor as an example, a maximum voltage (VGMP) is usually directly selected as a data voltage corresponding to a gray level 0 of a display panel. To ensure that different display panels (e.g., from the same batch) can meet a target requirement, VGMP may be set to a relatively high value. However, even for the display panels from the same batch, the display panels may have different characteristics. As a result, for some display panels, the data voltage corresponding to the gray level 0 is too high if VGMP is still selected for the gray level 0. When a light-emitting pixel of the display panel displays an image at the gray level 0, an excessive data voltage may be applied to a gate of the P-type drive transistor in the pixel circuit, causing characteristics of the drive transistor to shift, for example, causing a positive shift of a threshold voltage. Due to a hysteresis effect of the transistor, when the image at the gray level 0 is switched to a next image at another gray level, the threshold voltage of the transistor cannot be immediately restored. As a result, the brightness of the display is affected by the previous image, and the problem of image sticking or smear is caused.

To solve the above problems, the embodiments of the present application provide a display control method and apparatus for a display panel, a device, and a storage medium. The embodiments of the display control method and apparatus for a display panel, the device, and the storage medium will be described below with reference to the accompanying drawings.

In the present application, the display panel may be an organic light-emitting diode (OLED) display panel. Certainly, other types of display panels may also be possible.

The display control method for a display panel provided in the embodiments of the present application is first described below.

FIG. 1 is a schematic flowchart of a display control method for a display panel according to an embodiment of the present application. As shown in FIG. 1, the display control method for a display panel provided in this embodiment of the present application may include S110 and S120.

In S110, a reference register value corresponding to a reference gray level of the display panel is obtained, where a display parameter of the display panel when the display panel performs reference gray level display based on the reference register value meets a target requirement, and the display parameter includes brightness.

In S120, the reference register value is adjusted to obtain a target register value, and use the target register value as a register value corresponding to a gray level 0 of the display panel, where brightness of the display panel when the display panel performs gray level 0 display based on the target register value meets a requirement.

Specific implementations of S110 and S120 are described in detail below.

According to the display control method for a display panel provided in this embodiment of the present application, taking a P-type drive transistor as an example, higher VGMP is not directly selected as a data voltage at the gray level 0. Instead, the target register value corresponding to the gray level 0 is determined based on the reference register value corresponding to the reference gray level. The register value corresponds to the data voltage, that is, the data voltage corresponding to the gray level 0 is determined based on a data voltage corresponding to the reference gray level, so that the data voltage corresponding to the gray level 0 may be determined according to an actual requirement of the display panel, thereby avoiding binding the data voltage at the gray level 0 to VGMP, and ameliorating the problems of image sticking and smear.

In addition, the data voltage corresponding to the gray level 0 may be understood as a black-state voltage. Higher VGMP is no longer directly selected as the data voltage at the gray level 0. Instead, the data voltage corresponding to the gray level 0 is determined based on the data voltage corresponding to the reference gray level, so that the data voltage corresponding to the gray level 0 may be determined according to the actual requirement of the display panel, which is equivalent to decreasing the black-state voltage corresponding to the gray level 0, and can reduce power consumption.

Specific implementations of the above steps are described below.

S110 is first described below.

For example, the reference gray level may be any gray level other than the gray level 0 in a grayscale range of the display panel. For example, the grayscale range of the display panel is gray levels 0 to 255, and the reference gray level may be any one of the gray levels 1 to 255.

Herein, to distinguish between different gray levels, a gray level referenced when the register value of the gray level 0 is determined is referred to as the reference gray level. To distinguish between register values corresponding to different gray levels, the register value corresponding to the reference gray level is referred to as the reference register value, and the register value corresponding to the gray level 0 is referred to as the target register value.

The register value can be understood as a register value corresponding to a gamma module of the display panel. The gamma module may be configured to generate a data voltage, and the generated data voltage may be transmitted to a pixel circuit to make the pixel circuit generate a drive current to drive a light-emitting element to emit light. For different register values, the gamma module may generate different data voltages.

The register value corresponds to the data voltage. For example, a correspondence between the register value and the data voltage may be as follows: a larger register value corresponds to a smaller data voltage value; and a smaller register value corresponds to a larger data voltage value.

Figure 2:
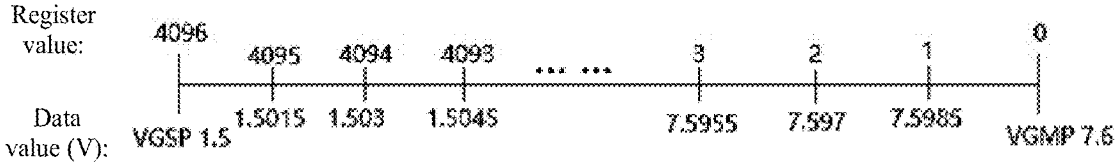
FIG. 2 is a schematic diagram of a correspondence between a register value and a data voltage in a display control method for a display panel according to an embodiment of the present application.

The correspondence between the register value and the data voltage is shown in FIG. 2. When the register value is 0, a corresponding data voltage is VGMP; for example, VGMP may be 7.6 V. When the register value is 4096, a corresponding data voltage is a minimum voltage (VGSP); for example, VGSP may be 1.5 V. When the register value gradually increases from 0 to 4096, the corresponding data voltage gradually decreases from 7.6 V to 1.5 V. The values in FIG. 2 are merely exemplary and are not intended to limit the present application.

For example, the target register value corresponding to the gray level 0 may be greater than 0, so that the data voltage corresponding to the gray level 0 is less than VGMP, thereby avoiding an excessive data voltage corresponding to the gray level 0, and ameliorating the problems of image sticking and smear.

The display parameter may include at least one of brightness and chromaticity coordinates, and correspondingly, the target requirement may include at least one of a brightness requirement and a chromaticity coordinates requirement. For example, the display parameter may include the brightness, and the corresponding target requirement may include the brightness requirement. For another example, the display parameter may include the chromaticity coordinates, and the corresponding target requirement may include the chromaticity coordinates requirement. For another example, the display parameter may include the brightness and the chromaticity coordinates, and the corresponding target requirement may include the brightness requirement and the chromaticity coordinates requirement.

The reference register value corresponding to the reference gray level may be predetermined. For example, before delivery of the display panel, gamma calibration may be performed on the display panel to determine register values respectively corresponding to a plurality of gray levels, that is, to determine data voltages respectively corresponding to the plurality of gray levels, to ensure that the display quality of the display panel meets requirements. The display panel may display a large number of gray levels. Taking the grayscale range of the display panel being gray levels 0 to 255 as an example, the display panel may display 256 gray levels. If gamma calibration is performed for each gray level, a long time is required for calibration.

Figure 3:
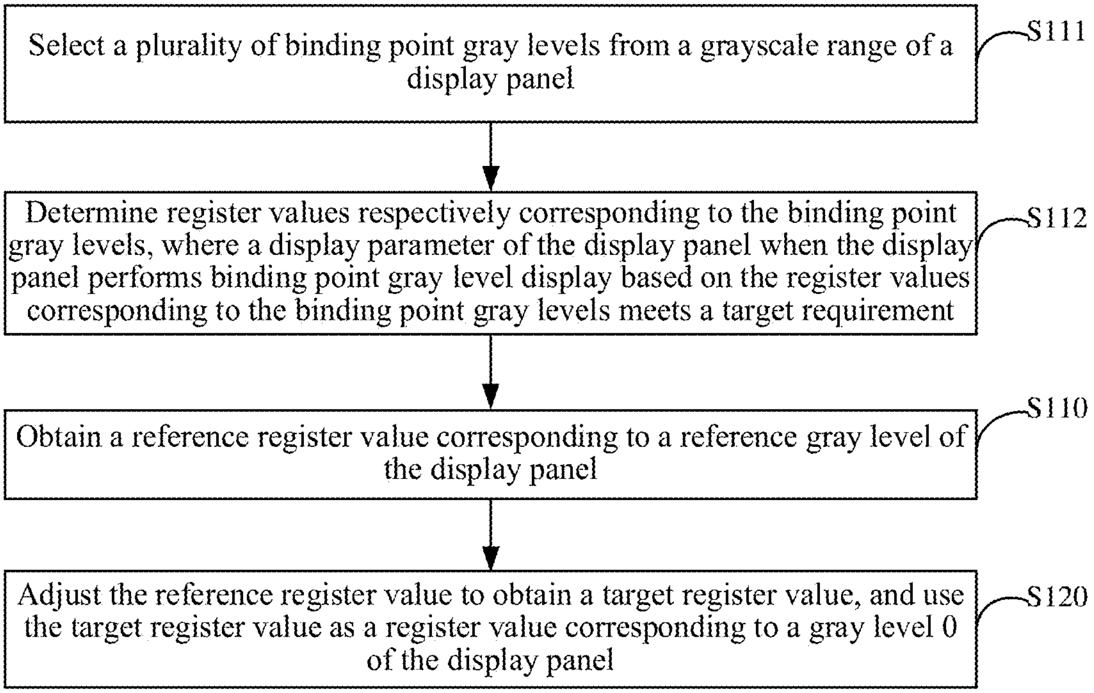
FIG. 3 to FIG. 7 are other schematic flowcharts of a display control method for a display panel according to embodiments of the present application.

In some optional embodiments, as shown in FIG. 3, before S110, the display control method for a display panel provided in this embodiment of the present application may further include S111 and S112.

In S111, a plurality of binding point gray levels are selected from a grayscale range of the display panel.

In S112, register values corresponding to the binding point gray levels are determined, where a display parameter of the display panel when the display panel performs binding point gray level display based on the register values corresponding to the binding point gray levels meets the target requirement.

According to this embodiment of the present application, gamma calibration may be performed only on binding point gray levels, to shorten a gamma calibration time.

Since the target register value corresponding to the gray level 0 is determined in S120, it can be understood that in S111, the grayscale range of the display panel may not include the gray level 0. Still taking the grayscale range of the display panel being gray levels 0 to 255 as an example, a plurality of gray levels may be selected from the gray levels 1 to 255 as the binding point gray levels. For example, the gray level 1, gray level 10, gray level 32, gray level 64, gray level 128, . . . , and gray level 255 may be selected as the binding point gray levels.

In S112, determining the register values corresponding to the binding point gray levels is to determine data voltages corresponding to the binding point gray levels.

As an example, taking the target requirement including the brightness requirement as an example, S112 may specifically include: for any binding point gray level, setting an initial register value corresponding to the binding point gray level, displaying an image corresponding to the binding point gray level based on the initial register value, and acquiring brightness; and if the acquired brightness does not meet the brightness requirement corresponding to the binding point gray level, adjusting the initial register value until the brightness acquired based on the adjusted initial register value meets the brightness requirement corresponding to the binding point gray level, where the adjusted initial register value may be used as the register value corresponding to the binding point gray level. It can be understood that if the brightness acquired based on the initial register value meets the brightness requirement corresponding to the binding point gray level, the initial register value may be directly used as the register value corresponding to the binding point gray level.

As an example, when the target requirement includes the brightness requirement and the chromaticity coordinates requirement, S112 may specifically include: for any binding point gray level, setting an initial register value corresponding to the binding point gray level, displaying an image corresponding to the binding point gray level based on the initial register value, and acquiring brightness; if the acquired brightness does not meet the brightness requirement corresponding to the binding point gray level, adjusting the initial register value until the brightness acquired based on the adjusted initial register value meets the brightness requirement corresponding to the binding point gray level; and then determining whether chromaticity coordinates acquired based on the adjusted initial register value meet the chromaticity coordinates requirement corresponding to the binding point gray level, and if the chromaticity coordinates requirement is not met, further adjusting the initial register value until the chromaticity coordinates acquired based on the adjusted initial register value meet the chromaticity coordinates requirement corresponding to the binding point gray level, where the adjusted initial register value may be used as the register value corresponding to the binding point gray level. It can be understood that if the brightness and the chromaticity coordinates acquired based on the initial register value meet the brightness requirement and the chromaticity coordinates requirement corresponding to the binding point gray level, the initial register value may be directly used as the register value corresponding to the binding point gray level.

In the above example in which whether the brightness requirement is met is determined first and then whether the chromaticity coordinates requirement is met is determined, whether the brightness requirement and the chromaticity coordinates requirement are met at the same time may be determined, which is not limited in the present application.

For example, register values corresponding to gray levels other than the binding point gray levels may be determined by linear interpolation. For example, register values corresponding to gray levels between a binding point gray level 32 and a binding point gray level 64 may be determined by linear interpolation based on register values respectively corresponding to the binding point gray level 32 and the binding point gray level 64.

For example, before S111, the display control method for a display panel provided in this embodiment of the present application may further include: setting a minimum voltage VGSP of the display panel, and determining a number of bits in a register. The minimum voltage VGSP can be understood as a data voltage corresponding to the brightest state of the display panel. The number of bits in the register may determine maximum and minimum values of the register.

For example, after S112, the display control method for a display panel provided in this embodiment of the present application may further include: storing the register values corresponding to the binding point gray levels in a storage module corresponding to the display panel. For example, after S120, the display control method for a display panel provided in this embodiment of the present application may further include: storing the target register value corresponding to the gray level 0 in the storage module corresponding to the display panel. For example, the register values corresponding to the binding point gray levels and the target register value corresponding to the gray level 0 may be stored in a driver chip corresponding to the display panel.

The register values corresponding to the binding point gray levels are determined by actual calibration, while register values corresponding to other gray levels may be determined based on linear interpolation. Therefore, the register values corresponding to the binding point gray levels have higher accuracy. The reference gray level may be one of a plurality of binding point gray levels, thereby improving the accuracy of the target register value corresponding to the gray level 0.

For example, the reference gray level may be a binding point gray level with the smallest grayscale value among the plurality of binding point gray levels. Thus, a difference between the reference gray level and the gray level 0 is small, and the register value corresponding to the reference gray level may be adjusted slightly to quickly determine the register value corresponding to the gray level 0.

For example, the reference gray level may be a gray level 1. Thus, a difference between the reference gray level and the gray level 0 is the smallest, allowing for a smooth transition between the reference gray level and the gray level 0.

The display panel may have a brightness adjustment function, so that the same image may be displayed with different brightness. For example, the display panel may include levels configured for brightness adjustment. Taking a mobile phone as an example, a brightness bar may be provided, and different positions of the brightness bar can be understood as different levels for brightness adjustment. The reference register value corresponding to the reference gray level has different values for at least part of different levels. The target register value corresponding to the gray level 0 is determined based on the reference gray level, so that the target register value corresponding to gray level 0 may have different values for at least part of different levels.

In S112, the register values corresponding to the binding point gray levels at any level may be determined separately. In S120, the register value corresponding to the gray level 0 at any level may be determined separately.

Next, S120 is described.

For example, a drive transistor in a pixel circuit may be a P-type transistor. For example, the pixel circuit has a threshold voltage compensation function. When the drive transistor is turned on, a drive current may be calculated by formula (1):

$$I=K(Vdd-V\text{data})^2 \quad (1)$$

where I represents the drive current, K is a constant, Vdd represents a power voltage, and Vdata represents a data voltage. Vdata and Vdd are both positive numbers, with Vdata being less than or equal to Vdd.

The brightness is positively correlated with the drive current, i.e., a higher drive current indicates higher brightness; and a lower drive current indicates lower brightness. The data voltage is inversely correlated with the drive current. A higher data voltage indicates a lower drive current; and a lower data voltage indicates a higher drive current. In addition, the gray level is positively correlated with the brightness. The gray level is inversely correlated with the data voltage. A lower gray level requires a higher data voltage and indicates lower brightness. A higher gray level requires a lower data voltage and indicates higher brightness.

As described above, a larger register value corresponds to a smaller data voltage value; and a smaller register value corresponds to a larger data voltage value.

It can be understood that the reference gray level is higher than the gray level 0, the data voltage corresponding to the reference gray level may be less than the data voltage corresponding to the gray level 0, and correspondingly, the reference register value may be greater than the target register value corresponding to the gray level 0.

Figure 4:
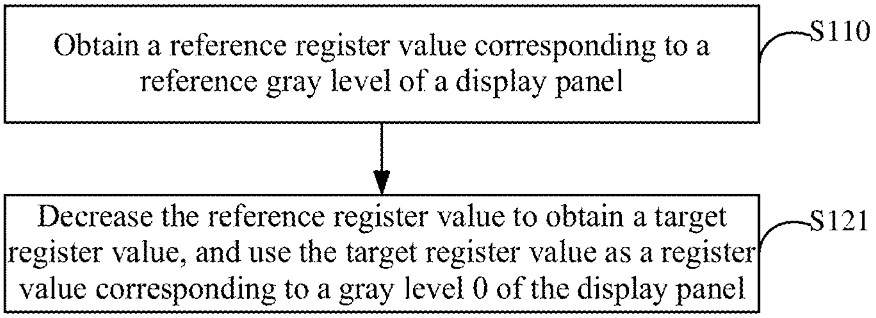

In some optional embodiments, as shown in FIG. 4, the adjusting the reference register value to obtain a target register value in S120 may specifically include S121.

In S121, the reference register value is decreased to obtain the target register value.

For example, the reference register value corresponding to the reference gray level is denoted as Ln, and by decreasing the reference register value by a register value X, the target register value L0 corresponding to the gray level 0 is obtained, that is, L0=Ln−X.

The register value corresponds to the data voltage. Decreasing the reference register value to obtain the target register value is to increase the data voltage corresponding to the reference register value to obtain the data voltage corresponding to the target register value.

For example, the data voltage corresponding to the reference register value is denoted as SLn, and by increasing the data voltage by a voltage Y, the data voltage SL0 (i.e., the data voltage corresponding to the gray level 0) corresponding to the target register value is obtained, that is, SL0=SLn+Y.

For example, the brightness of the display panel when the display panel performs the gray level 0 display based on the target register value meeting the requirement may include: a contrast of the display panel when the display panel performs the gray level 0 display based on the target register value meeting a contrast requirement.

It can be understood that the target register value L0 or the data voltage SL0 corresponding to the target register value obtained based on the value X or Y meets the contrast requirement. The contrast can be understood as a ratio of the brightest white to the darkest black that a display panel can display. It can also be understood that the brightness of the display panel when the display panel performs the gray level 0 display based on the target register value meets a dark-state requirement. A brightness threshold corresponding to the dark-state requirement may be set according to the contrast requirement. If a difference between the brightness of the display panel when the display panel performs the gray level 0 display based on the target register value and a brightness threshold corresponding to the dark-state requirement is within a preset range, it may be considered that a contrast of the display panel when the display panel performs the gray level 0 display based on the target register value meets the contrast requirement.

As an example, S121 may specifically include: setting an initial value, and calculating a difference between the reference register value and the initial value to obtain an initial difference; determining whether the contrast of the display panel when the display panel performs the gray level 0 display based on the initial difference meets the contrast requirement; if the contrast requirement is not met, continuously adjusting the initial value, and calculating a difference between the reference register value and an adjusted initial value to obtain an adjusted difference, until the contrast of the display panel when the display panel performs the gray level 0 display based on the adjusted difference meets the contrast requirement; and using the adjusted difference as the target register value.

It can be understood that if the contrast of the display panel when the display panel performs the gray level 0 display based on the initial difference meets the contrast requirement, the initial difference may be directly used as the target register value.

A lower data voltage leads to less impact on transistor characteristics, and makes it more conducive to ameliorating the problems of image sticking and smear. If the target register value can meet the contrast requirement, a larger target register value, which indicates a lower data voltage corresponding to the gray level 0, is a more desirable result.

In the above example, a small initial value may be preset. If the small initial value does not meet the requirement, the initial value may be gradually increased and adjusted to obtain a target register value that meets the contrast requirement and has a larger value.

The display panel may include sub-pixels of a plurality of colors, and the sub-pixels of the plurality of colors may be mixed into white light. Sub-pixels of different colors have different characteristics. For example, the sub-pixel of each color includes an OLED light-emitting device. An equivalent capacitance of the OLED light-emitting device corresponding to a green sub-pixel is larger. An equivalent capacitance of the OLED light-emitting device corresponding to a red sub-pixel and an equivalent capacitance of the OLED light-emitting device corresponding to a blue sub-pixel are smaller. A turn-on voltage of the green sub-pixel is greater than a turn-on voltage of the red sub-pixel and a turn-on voltage of the blue sub-pixel. Therefore, at the same data voltage, a turn-on speed of the green sub-pixel is slower than turn-on speeds of the red sub-pixel and the blue sub-pixel.

When the gray level is switched, for example, from the gray level 0 to another gray level, due to a hysteresis effect of a transistor, a threshold voltage of the transistor cannot be immediately restored. As a result, brightness of a first frame cannot reach a target brightness value. In addition, due to a slow turn-on speed of the green sub-pixel, the first frame has color shift in smear, for example, the first frame has red and pink smear.

Therefore, turn-on speeds of sub-pixels of colors may be balanced by setting a data voltage at the gray level 0. For example, a turn-on speed of a sub-pixel that is not easily turned on can be increased and a turn-on speed of a sub-pixel that is easily turned on can be decreased to ameliorate the color shift in the first frame.

The inventors have found through research that a higher data voltage corresponding to the gray level 0 makes it easier to turn on the sub-pixel. In contrast, a lower data voltage corresponding to the gray level 0 makes it less easy to turn on the sub-pixel.

Figure 5:
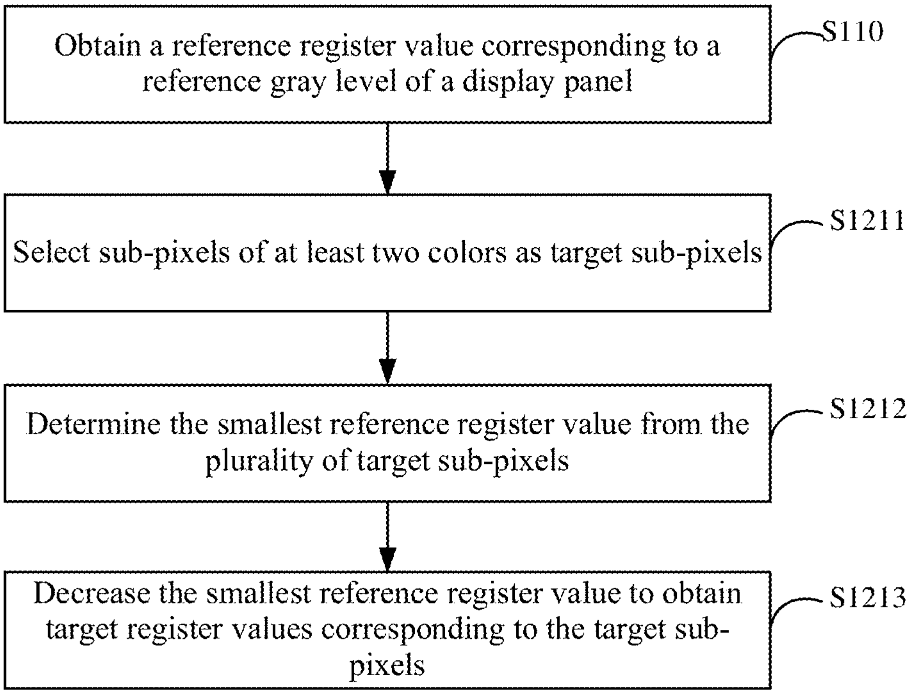

In some optional embodiments, as shown in FIG. 5, S121 may specifically include S1211 to S1213.

In S1211, sub-pixels of at least two colors are selected as target sub-pixels.

In S1212, the smallest reference register value is determined from the plurality of target sub-pixels.

In S1213, the smallest reference register value is decreased to obtain the target register value corresponding to each of the target sub-pixels.

In this embodiment of the present application, the smallest reference register value of the plurality of target sub-pixels is selected, that is, the greatest data voltage at the reference gray level of the plurality of target sub-pixels is selected. Thus, based on the greatest data voltage value, a higher data voltage corresponding to the gray level 0 may be obtained, thereby increasing the turn-on speed of the sub-pixel that is not easily turned on and decreasing the turn-on speed of the sub-pixel that is easily turned on, to ameliorate color shift in the first frame.

It can be understood that the target register values corresponding to the target sub-pixels are the same value. In S110, the obtained values may be the reference register values respectively corresponding to the target sub-pixels at the reference gray level, or the reference register values respectively corresponding to the sub-pixels of a plurality of colors at the reference gray level.

As an example, the sub-pixels of the plurality of colors in the display panel may all be the target sub-pixels. That is, the sub-pixels of the plurality of colors may all be used as comparison objects. For example, the display panel includes a red sub-pixel, a green sub-pixel, and a blue sub-pixel. In S1212, the smallest reference register value may be selected from the reference register values respectively corresponding to the red sub-pixel, the green sub-pixel, and the blue sub-pixel. Then, in S1213, the smallest reference register value is decreased to obtain values as the target register values corresponding to the red sub-pixel, the green sub-pixel, and the blue sub-pixel. Here, the target register values corresponding to the red sub-pixel, the green sub-pixel, and the blue sub-pixel are the same value.

Figure 6:
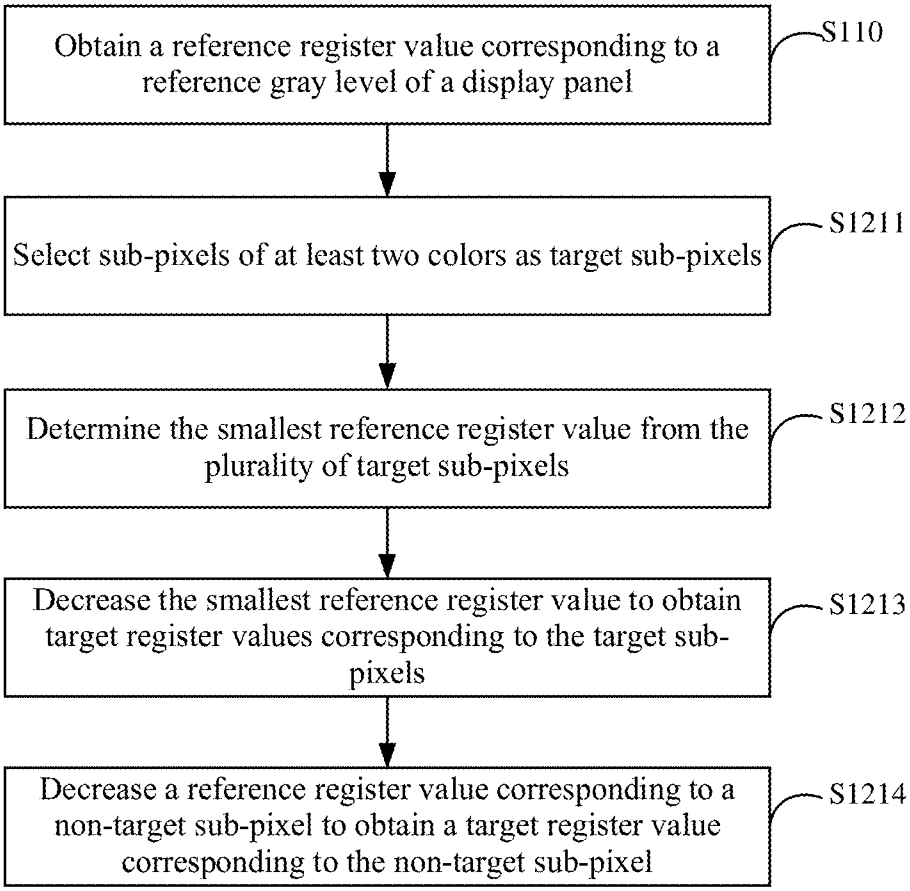

The inventors have found that in actual products, users have different requirements for the display effect of sub-pixels of colors, for example, separate requirements for turn-on speeds of sub-pixels of some colors. Thus, the sub-pixels with the separate requirement may be considered as non-target sub-pixels other than the target sub-pixels. As shown in FIG. 6, the display control method for a display panel provided in this embodiment of the present application may further include S1214.

In S1214, the reference register value corresponding to the non-target sub-pixel is decreased to obtain the target register value corresponding to the non-target sub-pixel.

For example, the non-target sub-pixels may include a red sub-pixel, and the target sub-pixels may include a green sub-pixel and a blue sub-pixel. The reference register value corresponding to the red sub-pixel may be decreased to obtain the target register value corresponding to the red sub-pixel. The smallest reference register value in the green sub-pixel and the blue sub-pixel may be selected, and the smallest reference register value may be decreased to obtain the target register values corresponding to the green sub-pixel and the blue sub-pixel.

For another example, the non-target sub-pixels may include the green sub-pixel, and the target sub-pixels may include the red sub-pixel and the blue sub-pixel. The reference register value corresponding to the green sub-pixel may be decreased to obtain the target register value corresponding to the green sub-pixel. The smallest reference register value in the red sub-pixel and the blue sub-pixel may be selected, and the smallest reference register value may be decreased to obtain the target register values corresponding to the red sub-pixel and the blue sub-pixel.

For another example, the non-target sub-pixels may include the blue sub-pixel, and the target sub-pixels may include the red sub-pixel and the green sub-pixel. The reference register value corresponding to the blue sub-pixel may be decreased to obtain the target register value corresponding to the blue sub-pixel. The smallest reference register value in the red sub-pixel and the green sub-pixel may be selected, and the smallest reference register value may be decreased to obtain the target register values corresponding to the red sub-pixel and the green sub-pixel. For example, the correspondence between the gray level and the register value may include: a smaller gray level value being corresponding to a larger register value; and a larger gray level value being corresponding to a smaller register value. For example, an N-type transistor is used as a drive transistor in a pixel circuit. A lower gray level requires a lower data voltage and indicates lower brightness. A higher gray level requires a higher data voltage and indicates higher brightness. Therefore, taking the N-type drive transistor as an example, a relationship between the gray level, the register value, and the data voltage may include: a smaller gray level value being corresponding to a larger register value, and being corresponding to a lower data voltage; and a larger register value being corresponding to a smaller register value, and being corresponding to a higher data voltage.

Similarly, if the minimum voltage (VGSP) is directly selected as the data voltage corresponding to the gray level 0 of the display panel, for some display panels, if VGSP is still selected for the gray level 0, the data voltage corresponding to the gray level 0 is too low. When a light-emitting pixel of the display panel displays an image at the gray level 0, an excessive low data voltage may be applied to a gate of an N-type drive transistor in a pixel circuit, causing characteristics of the drive transistor to shift, for example, a negative shift of a threshold voltage, and also causing the problem of image sticking or smear.

In some optional embodiments, the adjusting the reference register value to obtain a target register value in S120 may specifically include: increasing the reference register value corresponding to the reference gray level to obtain the target register value corresponding to the gray level 0.

Taking an N-type drive transistor as an example, lower VGSP may not be directly selected as the data voltage at the gray level 0. Instead, the reference register value corresponding to the reference gray level may be increased to obtain the target register value corresponding to the gray level 0. The register value corresponds to the data voltage, that is, the data voltage corresponding to the gray level 0 is determined based on a data voltage corresponding to the reference gray level, so that the data voltage corresponding to the gray level 0 may be determined according to an actual requirement of the display panel, thereby avoiding binding the data voltage at the gray level 0 to VGSP, and ameliorating the problems of image sticking and smear.

It can be understood that the grayscale value of the reference gray level is greater than that of the gray level 0.

As mentioned above, equivalent capacitances of OLED light-emitting devices corresponding to the sub-pixels of colors are different, resulting in the problems of color shift of smear. The inventors have found through research that the problem of color shift of smear is mainly caused by different turn-on speeds of the sub-pixels of the colors. For example, the turn-on speed of the green sub-pixel is slower than that of the red sub-pixel, and the brightness of the green sub-pixel is lower in a first frame, resulting in an imbalance in a white light ratio, and further resulting in red color shift when a black image is switched to a white image.

From another perspective, if VGMP is used for the gray levels 0 of the sub-pixels of the colors, it will result in different turn-off lengths of the sub-pixels of the colors. The inventors have found through research that the data voltages of the sub-pixels of the colors at the reference gray level are different, where a data voltage of the red sub-pixel at the reference gray level (e.g., the gray level 1) is significantly greater than data voltages of the green sub-pixel and the blue sub-pixel at the reference gray level. Thus, a leakage current of the red sub-pixel is greater than leakage currents of the green sub-pixel and the blue sub-pixel, resulting in red color shift when a black image is switched to a white image.

In some optional embodiments, for example, the display panel may include a first sub-pixel and a second sub-pixel, the first sub-pixel and the second sub-pixel have different colors, and a capacitance of the first sub-pixel is less than a capacitance of the second sub-pixel. The capacitance here may be an equivalent capacitance of an OLED light-emitting device corresponding to a sub-pixel. As an example, the first sub-pixel may include a red sub-pixel, and the second sub-pixel may include a green sub-pixel.

The reference register value corresponding to the first sub-pixel at the reference gray level is a first reference register value, and the target register value corresponding to the first sub-pixel at the gray level 0 is a first target register value; the reference register value corresponding to the second sub-pixel at the reference gray level is a second reference register value, and the target register value corresponding to the second sub-pixel at the gray level 0 is a second target register value.

The register value corresponds to the data voltage. A data voltage corresponding to the first reference register value is a first reference data voltage, and a data voltage corresponding to the first target register value is a first target data voltage; a data voltage corresponding to the second reference register value is a second reference data voltage, and a data voltage corresponding to the second target register value is a second target data voltage.

A first difference between the first target data voltage and the first reference data voltage is greater than a second difference between the second target data voltage and the second reference data voltage.

Both the first difference and the second difference may be positive numbers. The first reference data voltage and the second reference data voltage may be different. The first target data voltage and the second target data voltage may be different.

For example, the first target data voltage is denoted as SL0(R), the first reference data voltage is denoted as SLn (R), and the first difference is denoted as Y(R), where SL0(R)=SLn(R)+Y(R). The second target data voltage is denoted as SL0(G), the second reference data voltage is denoted as SLn(G), and the second difference is denoted as Y(G), where SL0(G)=SLn(G)+Y(G). Y(R)>Y(G).

Using the first sub-pixel as the red sub-pixel and the second sub-pixel as the green sub-pixel, because Y(R)>Y (G), when a black image is switched to a white image, a current of the green sub-pixel is greater than that of the red sub-pixel. According to the relation Q=I*t, ensuring Q(R) <Q(G), a quantity of charges accumulated by the green sub-pixel is greater than a quantity of charges accumulated by the red sub-pixel over the same time, so as to make the turn-on speed of the green sub-pixel and the turn-on speed of the red sub-pixel as consistent as possible, and to ameliorate the problem of color shift.

In some optional embodiments, the display panel may further include a third sub-pixel, where any two of the first sub-pixel, the second sub-pixel, and the third sub-pixel have different colors, and the capacitance of the first sub-pixel is less than a capacitance of the third sub-pixel. The capacitance here may also be an equivalent capacitance of an OLED light-emitting device corresponding to a sub-pixel. As an example, the first sub-pixel may include a red sub-pixel, the second sub-pixel may include a green sub-pixel, and the third sub-pixel may include a blue sub-pixel.

The reference register value corresponding to the third sub-pixel at the reference gray level is a third reference register value, the target register value corresponding to the third sub-pixel at the gray level 0 is a third target register value, a data voltage corresponding to the third reference register value is a third reference data voltage, a data voltage corresponding to the third target register value is a third target data voltage, a difference between the third target data voltage and the third reference data voltage is a third difference, and the first difference is greater than the third difference.

The first difference, the second difference, and the third difference may all be positive numbers. The first reference data voltage, the second reference data voltage, and the third reference data voltage may be different. The first target data voltage, the second target data voltage, and the third target data voltage may be different.

For example, still, the first target data voltage is denoted as SL0(R), the first reference data voltage is denoted as SLn(R), and the first difference is denoted as Y(R), where SL0(R)=SLn(R)+Y(R). The second target data voltage is denoted as SL0(G), the second reference data voltage is denoted as SLn(G), and the second difference is denoted as Y(G), where SL0(G)=SLn(G)+Y(G). In addition, the third target data voltage is denoted as SL0(B), the third reference data voltage is denoted as SLn(B), and the third difference is denoted as Y(B), where SL0(B)=SLn(B)+Y(B).

$$Y(R)>Y(B).$$

Similarly, using the first sub-pixel as the red sub-pixel and the third sub-pixel as the blue sub-pixel, because Y(R)>Y (B), when a black image is switched to a white image, a current of the blue sub-pixel is greater than a current of the red sub-pixel. According to the relation Q=I*t, ensuring Q(R)<Q(B), a quantity of charges accumulated by the blue sub-pixel is greater than a quantity of charges accumulated by the red sub-pixel over the same time, so as to make the turn-on speed of the blue sub-pixel and the turn-on speed of the red sub-pixel as consistent as possible, and also to ameliorate the problem of color shift.

For example, a capacitance of the second sub-pixel may be greater than a capacitance of the third sub-pixel. The third difference may be greater than the second difference, that is, Y(B)>Y(G).

The inventors have found through research that when the first difference is twice the second difference and the third difference is 1.2 times the second difference, a good display effect may be provided.

For example, Y(R)=OFFSET*2, Y(G)=OFFSET, and Y(B)=OFFSET*1.2.

OFFSET is a positive number. A specific value of OFFSET may be set according to an actual requirement.

Taking the second sub-pixel (G sub-pixel) as an example, in a process of determining the specific value of OFFSET, the initial value corresponding to OFFSET may be set first. The data voltage corresponding to the gray level 0 is obtained based on the initial value, and whether the display effect based on the initial value meets a requirement is determined. If the requirement is met, the initial value may be used as the value of OFFSET. If the requirement is not met, the initial value is adjusted to make the display effect based on an adjusted initial value meet the requirement. The adjusted initial value may be used as the value of OFFSET.

After the OFFSET value of the second sub-pixel is determined, the OFFSET value of the second sub-pixel may be multiplied by a corresponding coefficient to obtain a difference between the first sub-pixel (R sub-pixel) and the third sub-pixel (B sub-pixel).

The inventors have also found that the second sub-pixel can be turned off normally only when the second difference is greater than or equal to 0.2 V. In addition, in the related art, taking the reference gray level being the gray level 1 as an example, the data voltage of the first sub-pixel (e.g., the red sub-pixel) at the gray level 1 is already relatively large, e.g., greater than 7.2 V. Even if the data voltage of the first sub-pixel at the gray level 0 is VGMP (e.g., 7.6 V), the first difference still cannot reach 0.4 V. To ensure that the second difference is greater than or equal to 0.2 V and the first difference is twice the second difference, the first difference needs to be increased. For example, when the data voltage of the first sub-pixel at the gray level 0 is less than VGMP, the data voltage of the first sub-pixel at the reference gray level (e.g., the gray level 1) needs to be decreased.

Figure 7:
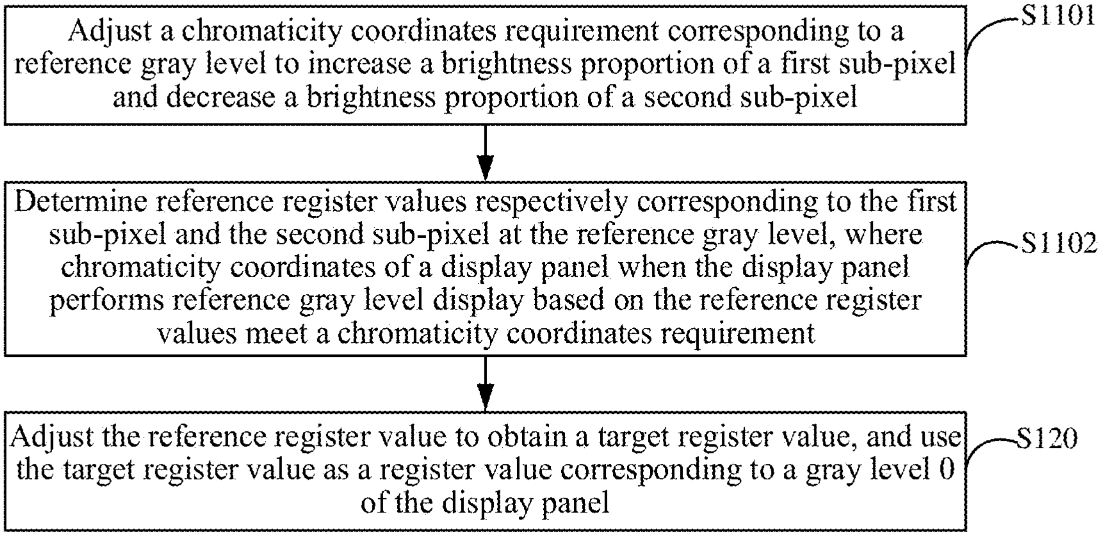

In some optional embodiments, as shown in FIG. 7, S110 may include S1101 and S1102.

In S1101, a chromaticity coordinates requirement corresponding to the reference gray level is adjusted to increase a brightness proportion of the first sub-pixel and decrease a brightness proportion of the second sub-pixel.

In S1102, the reference register values respectively corresponding to the first sub-pixel and the second sub-pixel at the reference gray level are determined, where chromaticity coordinates of the display panel when the display panel performs reference gray level display based on the reference register values meet the chromaticity coordinates requirement.

For example, the reference gray level may be the gray level 1, and adjustment may be performed according to a chromaticity coordinates requirement corresponding to a high gray level being a white point (0.299/0.315). To decrease the data voltage corresponding to the first sub-pixel at the reference gray level, the brightness proportion of the first sub-pixel at the reference gray level may be increased and the brightness proportion of the second sub-pixel at the reference gray level may be decreased. For example, still taking the reference gray level being the gray level 1 as an example, adjustment may be performed according to the chromaticity coordinates requirement of (0.299/0.315), thereby decreasing the data voltage corresponding to the first sub-pixel at the reference gray level and increasing the data voltage corresponding to the second sub-pixel at the reference gray level. The decrease in the data voltage corresponding to the first sub-pixel at the reference gray level may enable the first difference to be increased, such that the first difference reaches 0.4 V while ensuring that the second difference is greater than or equal to 0.2 V, thereby making the turn-on speeds of the first sub-pixel and the second sub-pixel as consistent as possible.

In the above example, the first sub-pixel includes the red sub-pixel, and the second sub-pixel includes the green sub-pixel.

It should be noted that the display control method for a display panel provided in this embodiment of the present application may be performed by a register value determination apparatus for a display panel, or by a control module configured in the register value determination apparatus for a display panel to perform the display control method for a display panel. In the embodiments of the present application, a register value determination apparatus for a display panel provided in the embodiments of the present application is described by using an example in which the display control method for a display panel is performed by the register value determination apparatus for a display panel.

Figure 8:
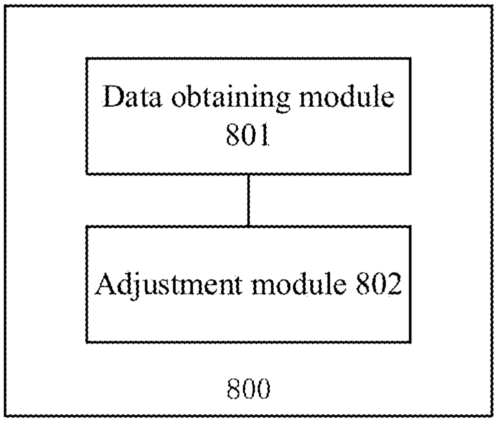
FIG. 8 is a schematic diagram of a structure of a register value determination apparatus for a display panel according to an embodiment of the present application.

Based on the same inventive concept, the embodiments of the present application further provide a register value determination apparatus for a display panel. As shown in FIG. 8, the embodiments of the present application further provide a register value determination apparatus 800 for a display panel, where the register value determination apparatus may include a data obtaining module 801 and an adjustment module 802.

The data obtaining module 801 is configured to obtain a reference register value corresponding to a reference gray level of a display panel, where a display parameter of the display panel when the display panel performs reference gray level display based on the reference register value meets a target requirement, and the display parameter includes brightness.

The adjustment module 802 is configured to adjust the reference register value to obtain a target register value, and use the target register value as a register value corresponding to a gray level 0 of the display panel, where brightness of the display panel when the display panel performs gray level 0 display based on the target register value meets a requirement.

According to the register value determination apparatus for a display panel provided in this embodiment of the present application, higher VGMP is not directly selected as a data voltage at the gray level 0. Instead, the target register value corresponding to the gray level 0 is determined based on the reference register value corresponding to the reference gray level. The register value corresponds to the data voltage, that is, the data voltage corresponding to the gray level 0 is determined based on a data voltage corresponding to the reference gray level, so that the data voltage corresponding to the gray level 0 may be determined according to an actual requirement of the display panel, thereby avoiding binding the data voltage at the gray level 0 to VGMP, and ameliorating the problems of image sticking and smear.

In some optional embodiments, the adjustment module 802 is specifically configured to:

decrease the reference register value to obtain the target register value.

Preferably, the target register value is greater than 0.

Preferably, the display panel includes a plurality of levels configured for brightness adjustment, and the reference register value corresponding to the reference gray level has different values for at least part of different levels.

In some optional embodiments, the display panel includes sub-pixels of a plurality of colors, and the adjustment module 802 is specifically configured to:

select sub-pixels of at least two colors as target sub-pixels;

determine the smallest reference register value from the plurality of target sub-pixels; and decrease the smallest reference register value to obtain the target register value corresponding to each of the target sub-pixels.

In some optional embodiments, the sub-pixels of the plurality of colors in the display panel are all the target sub-pixels.

In some optional embodiments, the sub-pixels of the plurality of colors in the display panel further include a non-target sub-pixel other than the target sub-pixels, and the adjustment module 802 is further configured to:

decrease the reference register value corresponding to the non-target sub-pixel to obtain the target register value corresponding to the non-target sub-pixel.

In some optional embodiments, the display panel includes a first sub-pixel and a second sub-pixel, the first sub-pixel and the second sub-pixel have different colors, and a capacitance of the first sub-pixel is less than a capacitance of the second sub-pixel.

The reference register value corresponding to the first sub-pixel at the reference gray level is a first reference register value, and the target register value corresponding to the first sub-pixel at the gray level 0 is a first target register value; the reference register value corresponding to the second sub-pixel at the reference gray level is a second reference register value, and the target register value corresponding to the second sub-pixel at the gray level 0 is a second target register value.

A data voltage corresponding to the first reference register value is a first reference data voltage, and a data voltage corresponding to the first target register value is a first target data voltage; a data voltage corresponding to the second reference register value is a second reference data voltage, and a data voltage corresponding to the second target register value is a second target data voltage.

A first difference between the first target data voltage and the first reference data voltage is greater than a second difference between the second target data voltage and the second reference data voltage.

In some optional embodiments, the display panel further includes a third sub-pixel, where any two of the first sub-pixel, the second sub-pixel, and the third sub-pixel have different colors, and the capacitance of the first sub-pixel is less than a capacitance of the third sub-pixel. The reference register value corresponding to the third sub-pixel at the reference gray level is a third reference register value, the target register value corresponding to the third sub-pixel at the gray level 0 is a third target register value, a data voltage corresponding to the third reference register value is a third reference data voltage, a data voltage corresponding to the third target register value is a third target data voltage, a difference between the third target data voltage and the third reference data voltage is a third difference, and the first difference is greater than the third difference.

In some optional embodiments, the third difference is greater than the second difference.

In some optional embodiments, the first difference is twice the second difference.

In some optional embodiments, the third difference is 1.2 times the second difference.

In some optional embodiments, the second difference is greater than or equal to 0.2 V.

In some optional embodiments, the data obtaining module 801 is specifically configured to:

- adjust a chromaticity coordinates requirement corresponding to the reference gray level to increase a brightness proportion of the first sub-pixel and decrease a brightness proportion of the second sub-pixel; and
- determine the reference register values respectively corresponding to the first sub-pixel and the second sub-pixel at the reference gray level, where chromaticity coordinates of the display panel when the display panel performs reference gray level display based on the reference register values meet the chromaticity coordinates requirement.

In some optional embodiments, the first sub-pixel includes a red sub-pixel, and the second sub-pixel includes a green sub-pixel.

In some optional embodiments, the adjustment module 802 is further configured to:

- select a plurality of binding point gray levels from a grayscale range of the display panel; and
- determine register values corresponding to the binding point gray levels, where a display parameter of the display panel when the display panel performs binding point gray level display based on the register values corresponding to the binding point gray levels meets the target requirement.

In some optional embodiments, one of the plurality of binding point gray levels is the reference gray level.

In some optional embodiments, a binding point gray level with the smallest grayscale value among the plurality of binding point gray levels is the reference gray level.

In some optional embodiments, the reference gray level includes a gray level 1.

In some optional embodiments, the adjustment module 802 is specifically configured to:

- increase the reference register value to obtain the target register value.

The register value determination apparatus for a display panel in this embodiment of the present application may be an apparatus, or a component, an integrated circuit, or a chip in a terminal. The apparatus may be a mobile electronic device or a non-mobile electronic device. For example, the mobile electronic device may be a mobile phone, a tablet computer, a notebook computer, a palm computer, a vehicle-mounted electronic device, a wearable device, an ultra-mobile personal computer (UMPC), a netbook, a personal digital assistant (PDA), or the like; and the non-mobile electronic device may be a server, a network attached storage (NAS), a personal computer (PC), a television (TV), an automated teller machine, a self-service machine, or the like, which are not specifically limited in the embodiments of the present application.

The register value determination apparatus for a display panel provided in this embodiment of the present application can implement each process in the embodiments of the register value determination method for a display panel in FIG. 1. To avoid repetition, details are not described herein again.

Figure 9:
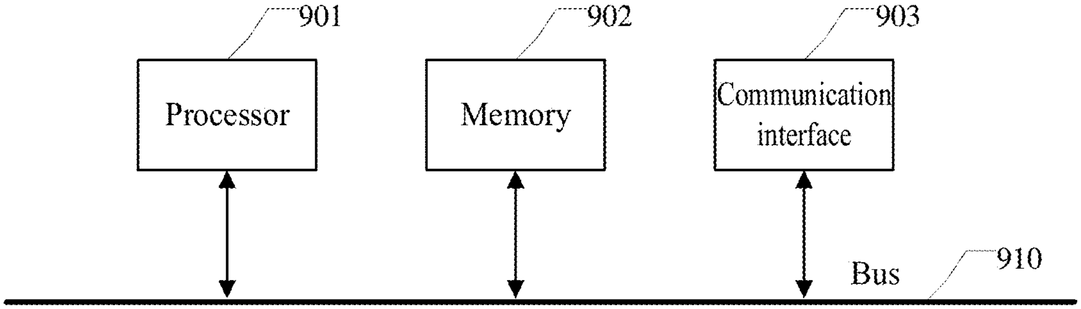
FIG. 9 is a schematic diagram of a structure of an electronic device according to an embodiment of the present application.

FIG. 9 is a schematic diagram of a hardware structure of an electronic device according to an embodiment of the present application.

The electronic device may include a processor 901 and a memory 902 storing computer program instructions.

Specifically, the processor 901 may include a central processing unit (CPU), or an application-specific integrated circuit (ASIC), or one or more integrated circuits that may be configured to implement the embodiments of the present invention.

The memory 902 may include a mass memory for data or instructions. As an example rather than a limitation, the memory 902 may include a hard disk drive (HDD), a floppy disk drive, a flash memory, an optical disc, a magneto-optical disc, a magnetic tape, a universal serial bus (USB) drive, or a combination of two or more thereof. When appropriate, the memory 902 may include a removable or non-removable (or fixed) medium. When appropriate, the memory 902 may be located inside or outside an integrated gateway disaster recovery device. In a particular embodiment, the memory 902 is a non-volatile solid state memory. In a particular embodiment, the memory 902 includes a read-only memory (ROM). When appropriate, the ROM may be a mask programmed ROM, a programmable ROM (PROM), an erasable PROM (EPROM), an electrically erasable PROM (EEPROM), an electrically alterable ROM (EAROM), a flash memory, or a combination of two or more thereof. For example, the memory may include a non-volatile transitory memory.

The processor 901 reads and executes the computer program instructions stored in the memory 902 to implement any of the register value determination methods for a display panel in the above embodiments.

In an example, the electronic device may further include a communication interface 903 and a bus 910. As shown in FIG. 9, the processor 901, the memory 902, and the communication interface 903 are connected and communicate with each other through the bus 910.

The communication interface 903 is mainly configured to implement communication between the modules, apparatuses, units, and/or devices in the embodiments of the present invention.

The bus 910 includes hardware, software, or both, and couples components of the electronic device to each other. As an example rather than a limitation, the bus may include an Accelerated Graphics Port (AGP) or other graphics buses, an Extended Industry Standard Architecture (EISA) bus, a front-side bus (FSB), a HyperTransport (HT) interconnect bus, an Industry Standard Architecture (ISA) bus, an Infini- Band interconnect bus, a low pin count (LPC) bus, a memory bus, a Micro Channel architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) or other suitable buses, or a combination of two or more thereof. When appropriate, the bus 910 may include one or more buses. Although specific buses are described and illustrated in this embodiment of the present invention, any suitable bus or interconnect is contemplated in the present invention.

The electronic device may perform the register value determination method for a display panel in the embodiments of the present application, thereby implementing the register value determination method and apparatus for a display panel as described with reference to FIG. 1 and FIG. 8.

The embodiments of the present application further provide a computer-readable storage medium having a computer program stored thereon. The computer program, when executed by a processor, causes the register value determination method for a display panel as described in the above embodiments to be implemented, and can achieve the same technical effects. To avoid repetition, details are not described herein again. The computer-readable storage medium may include a read-only memory (ROM), a random access memory (RAM), a magnetic disk, an optical disc, or the like, which is not limited here.

Functional blocks shown in block diagrams of structures described above may be implemented as hardware, software, firmware, or a combination thereof. When implemented as hardware, the functional blocks may be, for example, electronic circuits, application-specific integrated circuits (ASICs), appropriate firmware, plug-ins, function cards, or the like. When implemented as software, the elements of the present application are programs or code segments for performing required tasks. The programs or code segments may be stored in a machine-readable medium, or transmitted over a transmission medium or communication link by data signals carried on a carrier. The "computer-readable medium" may include any medium capable of storing or transmitting information. Examples of the computer-readable medium include electronic circuits, semiconductor memory devices, ROMs, flash memories, erasable ROMs (EROMs), floppy disks, CD-ROMs, optical discs, hard disks, fiber optic media, RF links, and the like. The code segments may be downloaded via computer networks such as the Internet or an intranet.

According to the embodiments of the present application, the computer-readable storage medium may be a non-transitory computer-readable storage medium.

It should also be noted that some methods or systems are described based on a series of steps or apparatuses in the exemplary embodiments mentioned in the present application. However, the present application is not limited to the order of the above steps, that is, the steps may be performed in the order mentioned in the embodiments, or in a different order from that in the embodiments, or several steps may be performed simultaneously.

The above describes all aspects of the present application with reference to the flowcharts and/or block diagrams of the method, the apparatus (system), and the computer program product according to the embodiments of the present application. It should be understood that each block in the flowcharts and/or block diagrams and a combination of blocks in the flowcharts and/or block diagrams may be implemented by computer program instructions. The computer program instructions may be provided to a processor of a general-purpose computer, a special-purpose computer, or another programmable data processing apparatus to produce a machine, such that execution of the instructions by the processor of the computer or another programmable data processing apparatus enables implementation of functions/actions specified in one or more blocks of the flowcharts and/or block diagrams. Such a processor may be, but is not limited to, a general-purpose processor, a dedicated processor, a special application processor, or a field programmable logic circuit. It can also be understood that each block in the block diagrams and/or flowcharts and a combination of blocks in the block diagrams and/or flowcharts may be implemented by dedicated hardware for performing specified functions or actions, or by a combination of dedicated hardware and computer instructions.

According to the embodiments described above in the present application, the embodiments are not intended to exhaust all details, nor do they limit the application to only the described particular embodiments. Apparently, many modifications and variations may be made in light of the above description. In this specification, these embodiments are selected and specifically described to provide a better explanation of the principles and practical applications of the present application, so that those skilled in the art can make good use of the present application and make modifications based on the present application for use. The present application should be defined only by the claims, and the full scope and equivalents thereof.

What is claimed is:

1. A display control method for a display panel, comprising:

obtaining a reference register value corresponding to a reference gray level of the display panel, wherein a display parameter of the display panel when the display panel performs reference gray level display based on the reference register value meets a target requirement, and the display parameter comprises brightness; and adjusting the reference register value to obtain a target register value, and using the target register value as a register value corresponding to a gray level 0 of the display panel, wherein brightness of the display panel when the display panel performs gray level 0 display based on the target register value meets a requirement;

wherein the display panel comprises a first sub-pixel and a second sub-pixel, the first sub-pixel and the second sub-pixel have different colors, and a capacitance of the first sub-pixel is less than a capacitance of the second sub-pixel;

a reference register value corresponding to the first sub-pixel at the reference gray level is a first reference register value, and a target register value corresponding to the first sub-pixel at the gray level 0 is a first target register value, a reference register value corresponding to the second sub-pixel at the reference gray level is a second reference register value, and a target register value corresponding to the second sub-pixel at the gray level 0 is a second target register value;

a data voltage corresponding to the first reference register value is a first reference data voltage, and a data voltage corresponding to the first target register value is a first target data voltage, a data voltage corresponding to the second reference register value is a second reference data voltage, and a data voltage corresponding to the second target register value is a second target data voltage; and a first difference between the first target data voltage and the first reference data voltage is greater than a second difference between the second target data voltage and the second reference data voltage.

2. The method according to claim 1, wherein the adjusting the reference register value to obtain a target register value comprises:

decreasing the reference register value to obtain the target register value.

3. The method according to claim 2, wherein the target register value is greater than 0; and the display panel comprises a plurality of levels configured for brightness adjustment, and the reference register value corresponding to the reference gray level has different values for at least part of different levels of the plurality of levels.

4. The method according to claim 2, wherein the display panel comprises sub-pixels of a plurality of colors, and the decreasing the reference register value to obtain the target register value comprises:

selecting sub-pixels of at least two colors as target sub-pixels;

determining a smallest reference register value from the target sub-pixels; and decreasing the smallest reference register value to obtain the target register value corresponding to each of the target sub-pixels.

5. The method according to claim 4, wherein the sub-pixels of the plurality of colors in the display panel are all the target sub-pixels.

6. The method according to claim 4, wherein the sub-pixels of the plurality of colors in the display panel further comprise a non-target sub-pixel other than the target sub-pixels, and the method further comprises:

decreasing a reference register value corresponding to the non-target sub-pixel to obtain a target register value corresponding to the non-target sub-pixel.

7. The method according to claim 1, wherein the display panel further comprises a third sub-pixel, wherein any two of the first sub-pixel, the second sub-pixel, and the third sub-pixel have different colors, the capacitance of the first sub-pixel is less than a capacitance of the third sub-pixel, a reference register value corresponding to the third sub-pixel at the reference gray level is a third reference register value, a target register value corresponding to the third sub-pixel at the gray level 0 is a third target register value, a data voltage corresponding to the third reference register value is a third reference data voltage, a data voltage corresponding to the third target register value is a third target data voltage, a difference between the third target data voltage and the third reference data voltage is a third difference, and the first difference is greater than the third difference.

8. The method according to claim 7, wherein the third difference is greater than the second difference.

9. The method according to claim 7, wherein the first difference is twice the second difference; and the third difference is 1.2 times the second difference.

10. The method according to claim 7, wherein the second difference is greater than or equal to 0.2 V.

11. The method according to claim 1, wherein the obtaining a reference register value corresponding to a reference gray level of the display panel comprises:

adjusting a chromaticity coordinates requirement corresponding to the reference gray level to increase a brightness proportion of the first sub-pixel and decrease a brightness proportion of the second sub-pixel; and determining the reference register values respectively corresponding to the first sub-pixel and the second sub-pixel at the reference gray level, wherein chromaticity coordinates of the display panel when the display panel performs reference gray level display based on the reference register values meet the chromaticity coordinates requirement; and the first sub-pixel comprises a red sub-pixel, and the second sub-pixel comprises a green sub-pixel.

12. The method according to claim 1, wherein before the obtaining a reference register value corresponding to a reference gray level of the display panel, the method further comprises:

selecting a plurality of binding point gray levels from a grayscale range of the display panel; and determining register values corresponding to the binding point gray levels, wherein a display parameter of the display panel when the display panel performs binding point gray level display based on the register values corresponding to the binding point gray levels meets the target requirement.

13. The method according to claim 12, wherein one of the plurality of binding point gray levels is the reference gray level.

14. The method according to claim 12, wherein a binding point gray level with a smallest grayscale value among the plurality of binding point gray levels is the reference gray level.

15. The method according to claim 12, wherein the reference gray level comprises a gray level 1.

16. The method according to claim 1, wherein the adjusting the reference register value to obtain a target register value comprises:

increasing the reference register value to obtain the target register value.

17. A non-transitory computer-readable storage medium having a computer program stored thereon, wherein the computer program, when executed by a processor, causes the display control method for a display panel according to claim 1 to be implemented.

18. A display control apparatus for a display panel, comprising:

a data obtaining module configured to obtain a reference register value corresponding to a reference gray level of the display panel, wherein a display parameter of the display panel when the display panel performs reference gray level display based on the reference register value meets a target requirement, and the display parameter comprises brightness; and an adjustment module configured to adjust the reference register value to obtain a target register value, and use the target register value as a register value corresponding to a gray level 0 of the display panel, wherein brightness of the display panel when the display panel performs gray level 0 display based on the target register value meets a requirement;

wherein the display panel comprises a first sub-pixel and a second sub-pixel, the first sub-pixel and the second sub-pixel have different colors, and a capacitance of the first sub-pixel is less than a capacitance of the second sub-pixel;

a reference register value corresponding to the first sub-pixel at the reference gray level is a first reference register value, and a target register value corresponding to the first sub-pixel at the gray level 0 is a first target register value, a reference register value corresponding to the second sub-pixel at the reference gray level is a second reference register value, and a target register value corresponding to the second sub-pixel at the gray level 0 is a second target register value;

a data voltage corresponding to the first reference register value is a first reference data voltage, and a data voltage corresponding to the first target register value is a first target data voltage, a data voltage corresponding to the second reference register value is a second reference data voltage, and a data voltage corresponding to the second target register value is a second target data voltage; and a first difference between the first target data voltage and the first reference data voltage is greater than a second difference between the second target data voltage and the second reference data voltage.

19. An electronic device, comprising:

a processor and a memory storing computer program instructions, wherein the computer program instructions, when executed by the processor, cause a display control method for a display panel to be implemented, wherein the display control method for a display panel comprises:

obtaining a reference register value corresponding to a reference gray level of the display panel, wherein a display parameter of the display panel when the display panel performs reference gray level display based on the reference register value meets a target requirement, and the display parameter comprises brightness; and adjusting the reference register value to obtain a target register value, and using the target register value as a register value corresponding to a gray level 0 of the display panel, wherein brightness of the display panel when the display panel performs gray level 0 display based on the target register value meets a requirement;

wherein the display panel comprises a first sub-pixel and a second sub-pixel, the first sub-pixel and the second sub-pixel have different colors, and a capacitance of the first sub-pixel is less than a capacitance of the second sub-pixel;

a reference register value corresponding to the first sub-pixel at the reference gray level is a first reference register value, and a target register value corresponding to the first sub-pixel at the gray level 0 is a first target register value, a reference register value corresponding to the second sub-pixel at the reference gray level is a second reference register value, and a target register value corresponding to the second sub-pixel at the gray level 0 is a second target register value;

a data voltage corresponding to the first reference register value is a first reference data voltage, and a data voltage corresponding to the first target register value is a first target data voltage, a data voltage corresponding to the second reference register value is a second reference data voltage, and a data voltage corresponding to the second target register value is a second target data voltage; and a first difference between the first target data voltage and the first reference data voltage is greater than a second difference between the second target data voltage and the second reference data voltage.

* * * * *